UNITED STATES PATENT OFFICE.

GEORGE S. WRIGHT AND CHARLES WESLEY WRIGHT, OF PHILADELPHIA, PENNSYLVANIA.

COMPOSITION OF MATTER FOR PAVING BLOCKS, BUILDING BLOCKS, AND THE LIKE.

1,421,751.     Specification of Letters Patent.     Patented July 4, 1922.

No Drawing.     Application filed August 6, 1921. Serial No. 490,313.

*To all whom it may concern:*

Be it known that we, GEORGE S. WRIGHT and CHARLES WESLEY WRIGHT, both citizens of the United States, and residing in the city and county of Philadelphia, State of Pennsylvania, have invented a new and useful Composition of Matter for Paving Blocks, Building Blocks, and the like, of which the following is a specification.

In the manufacture of paving blocks, building blocks, fire brick, or the like, it is essential that the same should be made of material which is durable and impervious to moisture, not being affected by rain, snow and climatic conditions, and to the above ends, we have devised a novel composition of matter for paving blocks, building blocks, fire brick and the like, which we have found to possess the necessary requirements as to durability and imperviousness to climatic conditions, moisture and the like, which we attain by the use of the following ingredients, combined in substantially the proportions hereafter specified.

In carrying out our invention, we take ground fire clay, lime water, table salt, plastic asbestos cement, sand and ground graphite in substantially the proportions indicated in the table below:

| | |
|---|---|
| Fire clay | 15% |
| Lime water | 5% |
| Salt | 5% |
| Asbestos cement | 25% |
| Sand | 25% |
| Graphite | 25% |

The fire clay is preferably ground or pulverized, while the lime water is in the form of a liquid. The salt or sodium chloride may be ordinary table salt, and if desired may be sifted so as to be of a substantially uniform character, which is also true of the sand employed.

The asbestos cement is preferably used in plastic condition or in the form of a paste, while the graphite is preferably ground or pulverized so as to admit of a ready admixture with the other elements.

In carrying out our invention, the various ingredients are placed in a suitable receptacle in substantially the proportions stated in the above table, and are then thoroughly commingled either mechanically or manually, whereupon the composition is in the form of a thick paste, which upon being poured into suitable molds or other shapes and then baked will become hard in a comparatively short space of time as about half an hour and the resultant blocks can be employed for paving, building or other purposes.

We have found that a block constructed of the above material will be impervious to heat or moisture, will be extremely durable since it is not affected by heat or cold, and presents a wear resisting surface to traffic.

Having thus described our invention, what we claim as new and desire to secure by Letters Patent, is:—

1. The herein described composition of matter for blocks and the like composed of fire clay, lime water, salt, asbestos cement, sand and graphite, commingled in substantially the proportions described.

2. The herein described composition of matter for paving blocks, building blocks and the like, composed of 15 parts of ground fire clay, 5 parts of lime water, 5 parts of pulverized salt, 25 parts of plastic asbestos cement, 25 parts of sand, and 25 parts of ground graphite.

GEO. S. WRIGHT.
CHARLES WESLEY WRIGHT.

Witnesses:
E. HAYWARD FAIRBANKS,
C. D. McVAY.